3,072,693
BASIC COMPLEX LEAD COMPOUNDS
Alfred Szczepanek and Margarete Szczepanek, nee Schnoor, both of Niederau Uber Duren, Rhineland, Germany, assignors to Chemische Fabrik Hoesch K.-G., Duren, Germany, a company of Germany
No Drawing. Filed Dec. 20, 1956, Ser. No. 629,461
Claims priority, application Germany Dec. 22, 1955
12 Claims. (Cl. 260—435)

The present invention relates to new and valuable basic complex lead compounds and more particularly to basic complex lead compounds useful as pigments and stabilizers for halogen containing synthetic resins, and to a process of making same.

It is one object of the present invention to provide new and valuable basic complex lead compounds which have proved of value in the preparation of pigments and as stabilizers for synthetic resins containing halogen.

Another object of the present invention is to provide a simple and effective process of preparing such new and valuable basic complex lead compounds.

A further object of the present invention is to provide stabilized plastic compositions containing such complex lead compounds as stabilizers and especially polyvinyl-chloride plastics stabilized by such lead compounds.

Other objects of the present invention and advantageous features thereof will become apparent as the invention proceeds.

In principle the new basic complex lead compounds correspond to the following formula $$n PbO \cdot PbAc_1 \cdot m Pb(Ac_2)_x$$

In said formula $n$ indicates the numerals 0 to 16;
$m$ indicates the numerals 0.5 to 4;
$Ac_1$ indicates an inorganic dibasic acid residue, namely the $SO_4$—, $CO_3$—, and $HPO_3$— groups;
$Ac_2$ indicates an organic saturated monobasic aliphatic acid residue, such as stearic acid, lauric acid, ethyl hexanoic acid; an unsaturated dibasic aliphatic acid; a monobasic aromatic acid, such as benzoic acid or salicylic acid; or a dibasic aromatic acid such as phthalic acid; and
$x$ indicates the numeral 1 when $Ac_2$ is a dibasic acid and the numeral 2 when $Ac_2$ is a monobasic acid.

Such basic complex lead salts are produced according to the present invention by reacting basic inorganic lead salts with organic acids to form complex compounds. Especially suitable inorganic lead salts are tetrabasic lead sulfate, basic lead carbonate, and dibasic lead phosphite. Suitable organic acids used for this reaction are saturated and unsaturated mono- and dicarboxylic acids of the aliphatic and aromatic series such as, for instance, stearic acid, oleic acid, linoleic acid, maleic acid, α-ethyl hexanoic acid, adipic acid, benzoic acid, phthalic acid, lauric acid, fatty acids obtained on splitting coconut oil, ricinoleic acid, and the like. Such organic acids are used for the reaction with basic inorganic lead salts, either as such, or in mixture with each other. The reaction products with saturated and unsaturated fatty acids represent especially valuable stabilizers for processing polyvinyl chloride plastics because they impart to the basic inorganic lead compounds excellent sliding and lubricating properties.

The process according to the present invention may be modified by causing the resulting basic complex lead compounds to react with additional amounts of lead oxide. As a result thereof the heat-stabilizing lead content of the complex compound is increased. The above characterized complex lead compounds can be produced according to the following principal methods whereby the process may be carried out in the presence or in the absence of a catalyst:

(a) Reaction of the inorganic lead salts with water-insoluble organic acid:

(1) The organic acid is dispersed in flake form together with a catalyst in water at elevated temperature and the basic inorganic lead salt is added portion by portion to the dispersion.

(2) The basic inorganic lead salt is dispersed in water together with a catalyst and the flaky organic acid is added thereto portion by portion.

(3) The basic inorganic lead salt is dispersed in water and the molten organic acid is added to the dispersion while stirring.

(4) The basic inorganic lead salt and the pulverulent or flaky fatty acid are stirred without catalyst at elevated temperature for a prolonged period of time.

(5) Lead oxide and the inorganic acid are reacted to form the basic lead salt and the organic acid and, if desired, a catalyst, are added to the reaction mixture.

(b) Reaction of the inorganic lead salts with water-soluble organic acids:

(1) An aqueous solution of the organic acid is added to a dispersion of the basic inorganic lead salt in water.

(2) The basic inorganic lead salt is dispersed in water, if desired, together with the catalyst and the organic acid is added to the dispersion.

(c) The basic lead salt is first produced and is subsequently reacted with lead oxide with or without the addition of a catalyst and air is passed through the reaction mixture in order to produce a white reaction product and to introduce the maximum amount of lead oxide.

It is also possible to produce normal as well as higher basic complex lead compounds by starting with the basic components, namely inorganic acid, lead oxide, and organic acid. It is, however, advisable to proceed in such a manner that microcrystalline products are obtained, since the size of the surface area determines the usefulness of the basic complex compound as pigment and stabilizer.

The reactants are reacted with each other in stoichiometrical amounts. Since in almost all instances the resulting reaction products are insoluble, the yield is substantially quantitative. The reaction may be carried out at room temperature or at elevated temperature. Elevated temperature accelerates the reaction. The upper temperature limit is given by the melting point of the organic acid if it is insoluble in water. When using water-soluble acids, the temperature can be increased to the boiling temperature of water.

The amount of water present in this reaction is adjusted in such a manner that the dispersion of the reactants can properly be stirred. Stirring should be as vigorous as possible in order to increase the speed of reaction. Stirring devices of the grinding or crushing type are not required.

Substances which cause wetting of the reactants are especially suitable catalysts. Not only the known wetting agents but also organic compounds which have a low water-solubility exhibit such a wetting action and are useful catalysts. The amount of catalyst to be added depends upon its composition and upon the type of reactants used. In general 1% to 9%, calculated for solid components of the reaction mixture, are sufficient. Smaller amounts can, of course, also be used and the reaction proceeds also without the addition of the catalyst.

The reaction requires usually ½ to 4 hours to be completed. In some instances it may require more time or it may proceed in less than half an hour. After the reaction is completed, the final products are dried, preferably at 70–80° C.

In order to characterize the new compounds, their total lead content, their reactive lead content, i.e. that portion of the lead content which is capable of reacting with hydrochloric acid, their density, and their free fatty acid content are determined. The free fatty acid content serves also as an indication for the completeness of the reaction. When proceeding according to the methods given hereinabove under (a) sub. (1) to (5) and under (b) sub. (1) and (2) the reaction is considered to be completed as soon as the free fatty acid content has decreased to about 1% or less.

When producing higher basic products, the reaction is considered to be completed as soon as the yellow color of litharge has disappeared and a white product has been formed.

Of the basic lead sulfates to be used as starting materials, tetrabasic lead sulfate (4 $PbO \cdot PbSO_4$) has proved to be the most suitable reactant due to its high reactive lead content. Lower basic lead sulfates, such as, for instance, tribasic lead sulfate may also be used as starting material. The basic lead sulfates are produced according to known methods. They are directly converted into the basic complex lead compounds according to the present invention without any further processing and purification after their preparation. The formula of tetrabasic lead sulfate 4 $PbO \cdot PbSO_4$ leads one to assume that the 4 mols of lead oxide PbO are bound rather loosely and, thus, are quite reactive. It was found that said 4 mols of lead oxide can be reacted with 1 to 8 mols of monobasic organic acid or with 1 to 4 mols of dibasic organic acid. For instance, when using stearic acid, compounds of the general formula $$nPbO \cdot PbSO_4 \cdot mPb(C_{17}H_{35}COO)_2$$

wherein
$n$ indicates the numerals 3.5 to 0 and
$m$ the numerals 0.5 to 4.0, are obtained.

Additional lead oxide can be incorporated into such compounds until the coordination number 4 for lead sulfate and the coordination number 3 for lead stearate are completely occupied. The resulting compounds correspond to the following formula $$nPbO \cdot PbSO_4 \cdot mPb(C_{17}H_{35}COO)_2$$

wherein
$n$ indicates the numerals 4 to 16, and
$m$ the numerals 0.5 to 4.

The tendency of adding more than the stoichiometrical amounts of lead oxide depends on the ability of the used organic acid of forming basic lead compounds. Subsequent incorporation of lead oxide is, for instance, rather difficult when using oleic acid as organic acid component. In this case it is not possible to add as much lead oxide as when using saturated fatty acids.

When using dibasic lead phosphite $$(2\ PbO \cdot PbHPO_3 \cdot \tfrac{1}{2}\ H_2O)$$

as the inorganic reactant, it can be assumed that 2 mols of lead oxide per each mol of lead phosphite are capable of reacting with the organic acid. It follows that 4 mols of stearic acid are bound. However, it has been found that 5 mols of stearic acid can be reacted with 1 mol of basic lead phosphite. The reaction with the first 4 mols of stearic acid proceeds rather rapidly and the resulting products are characterized by the following formula:

$$nPbO \cdot PbHPO_3 \cdot \tfrac{1}{2}\ H_2O \cdot mPb(C_{17}H_{35}COO)_2$$

wherein
$n$ indicates the numerals 1.5 to 0, and
$m$ the numerals 0.5 to 2.0.

The theory is advanced, although the invention is not limited to such a theory, that reaction of basic lead phosphite with 5 mols of stearic acid yields a compound of about the following composition:

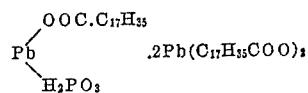

Further amounts of lead oxide can also be incorporated into said product until the coordination number 2 of lead phosphite and the coordination number 3 of lead stearate are completely occupied.

When using basic lead carbonate (white lead) corresponding to the formula $$Pb(OH)_2 \cdot 2PbCO_3$$

as the inorganic reaction component, it can be assumed that the group $Pb(OH)_2$ is capable of reacting with 2 mols of stearic acid when employing stearic acid as organic acid reactant. It has been found, however, that the reaction proceeds very smoothly until 4 mols of stearic acid are consumed and that, in addition thereto, reaction with 5 to 6 mols of stearic acid is possible. The speed of reaction is relatively uniform until 4 mols of stearic acid are introduced into the molecule. For the introduction of 5 mols of stearic acid a longer reaction time is required, namely 12 hours and for the introduction of 6 mols of stearic acid a reaction time of 30 hours was not even sufficient to achieve complete reaction. The resulting products are illustrated by the following formulas:

With 1 mol of stearic acid: $PbOH(C_{17}H_{35}COO) \cdot 2PbCO_3$;
With 2 mols of stearic acid: $Pb(C_{17}H_{35}COO)_2 \cdot 2PbCO_3$;
With 3 mols of stearic acid: $Pb(C_{17}H_{35}COO)_2 \cdot PbHCO_3(C_{17}H_{35}COO)$;
With 4 mols of stearic acid: $Pb(C_{17}H_{35}COO)_2 \cdot 2PbHCO_3(C_{17}H_{35}COO)$;
With 5 mols of stearic acid: $2Pb(C_{17}H_{35}COO)_2 \cdot PbHCO_3(C_{17}H_{35}COO)$;
With 6 mols of stearic acid: $3Pb(C_{17}H_{35}COO)_2$.

It is evident that normal lead stearate is obtained when carrying out the reaction to the end. Thus, a method of producing normal lead stearate from white lead and stearic acid has been made available by the present invention.

It is, of course, also possible to introduce additional amounts of lead oxide into the intermediate products prepared from basic lead carbonate and stearic acid.

The following examples serve to illustrate the present invention without, however, limiting the same thereto.

EXAMPLE 1

$$3PbO \cdot PbSO_4 \cdot Pb(C_{17}H_{35}COO)_2$$

3 g. of triethanolamine stearate are dissolved in 450 cc. of water. 54.4 g. of flaky stearic acid are added thereto at a temperature of 55° C. 119.5 g. of tetrabasic lead sulfate are added portion by portion to the warm dispersion while stirring vigorously. The reaction mixture is stirred for 2½ hours. The resulting white product is filtered off and dried at about 80° C. Total lead content: 60.2%. Content of lead capable of reacting with hydrochloric acid: 48.1%. Density: 2.4.

EXAMPLE 2

$$PbSO_4 \cdot 4Pb(C_{17}H_{35}COO)_2$$

59.8 g. of tetrabasic lead sulfate are dispersed in 400 cc. of water at room temperature, while stirring vigorously. 108.8 g. of molten stearic acid are slowly added to said dispersion. Subsequently the temperature is increased to 55° C. and stirring of the mixture is continued for 6 hours. The resulting white product is filtered off and dried at about 80° C. Total lead content: 31.4%. Content of lead capable of reacting with hydrochloric acid: 25.1%. Density: 1.4.

EXAMPLE 3

3.5PbO.PbSO$_4$.0.5Pb(C$_{17}$H$_{33}$COO)$_2$ 119.5 g. of tetrabasic lead sulfate are dispersed in 400 cc. of water at room temperature while stirring. 27.2 g. of oleic acid are added portion by portion to the dispersion at the same temperature. After half an hour the slightly yellowish product is filtered off and dried at about 70° C. Total lead content: 71.0%. Content of lead capable of reacting with hydrochloric acid: 56.8%. Density: 3.6.

EXAMPLE 4

3PbO.PbSO$_4$.PbC$_4$H$_8$(COO)$_2$ 14.6 g. of adipic acid are added to a dispersion of 119.5 g. of tetrabasic lead sulfate in 400 cc. of water. The mixture is stirred at room temperature for half an hour. The resulting white product is filtered off and dried at about 80° C. Total lead content: 77.8%. Content of lead capable of reacting with hydrochloric acid: 62.3%. Density: 3.4.

EXAMPLE 5

PbO.PbHPO$_3$.0.5H$_2$O.Pb(C$_{17}$H$_{35}$COO)$_2$ 52.4 g. of flaky stearic acid are dispersed at 55° C. in 700 cc. of water with the addition of 0.06 g. of sodium hydroxide while stirring. 74.3 g. of dibasic lead phosphite are added portion by portion to the dispersion. After half an hour the resulting white product is filtered off and is dried at about 80° C. Total lead content: 48.9%. Density: 1.9.

EXAMPLE 6

PbHPO$_3$.0.5H$_2$O.2Pb(C$_{17}$H$_{35}$COO)$_2$ 54.4 g. of molten stearic acid are slowly added at room temperature to a dispersion of 37.2 g. of dibasic lead phosphite in 400 cc. of water while stirring. Stirring of the reaction mixture at 55° C. is continued for 5½ hours. The resulting white product is filtered off and dried at about 80° C. Total lead content: 34.6%. Density: 1.7.

EXAMPLE 7

0.5Pb(OH)$_2$.2PbCO$_3$.0.5Pb(C$_{17}$H$_{35}$COO)$_2$ 77.6 g. of basic lead carbonate are dispersed at room temperature in 400 cc. of water with the addition of 5 cc. of polyethylene glycol (molecular weight 50,000). The temperature is increased to 55° C. and 27.2 g. of flaky stearic acid are added portion by portion to the dispersion. After 1 hour the white product filtered is off and dried at about 80° C. Total lead content: 59.8%. Density: 3.1.

In the following tables there are given a number of other basic complex lead salts according to the present invention. These compounds are prepared in the same manner as described hereinabove in the examples whereby the amounts of inorganic basic lead salt, of organic acid and, if desired, of lead oxide which are to be reacted, are given.

*Table I.—Reaction products of tetrabasic lead sulfate (a) and stearic acid (b)*

| Example No. | Molar ratio of— | | Formula of reaction product | Density | Total lead, percent | Reactive lead, percent |
|---|---|---|---|---|---|---|
| | (a) | (b) | | | | |
| 8 | 1 | 1 | 3.5 PbO·PbSO$_4$·0.5 Pb(C$_{17}$H$_{35}$COO)$_2$ | 2.6 | 71.0 | 56.8 |
| 9 | 1 | 2 | 3 PbO·PbSO$_4$·Pb(C$_{17}$H$_{35}$COO)$_2$ | 2.4 | 60.2 | 48.1 |
| 10 | 1 | 3 | 2.5 PbO·PbSO$_4$·1.5 Pb(C$_{17}$H$_{35}$COO)$_2$ | 2.0 | 52.2 | 41.7 |
| 11 | 1 | 4 | 2 PbO·PbSO$_4$·2 Pb(C$_{17}$H$_{35}$COO)$_2$ | 1.8 | 46.2 | 36.8 |
| 12 | 1 | 5 | 1.5 PbO·PbSO$_4$·2.5 Pb(C$_{17}$H$_{35}$COO)$_2$ | 1.5 | 41.3 | 33.0 |
| 13 | 1 | 6 | PbO·PbSO$_4$·3 Pb(C$_{17}$H$_{35}$COO)$_2$ | 1.4 | 37.3 | 29.9 |
| 14 | 1 | 7 | 0.5 PbO·PbSO$_4$·3.5 Pb(C$_{17}$H$_{35}$COO)$_2$ | 1.4 | 34.3 | 27.3 |
| 15 | 1 | 8 | PbSO$_4$·4 Pb(C$_{17}$H$_{35}$COO)$_2$ | 1.4 | 31.4 | 25.1 |

*Table II.—Reaction products of tetrabasic lead sulfate (a) and various acids (c–i)[1]*

| Example No. | Molar ratio of— | | Formula of reaction product | Density | Total lead, percent | Reactive lead, percent |
|---|---|---|---|---|---|---|
| | (a) | (c–i) | | | | |
| 16 | 1 | 1(c) | 3.5 PbO·PbSO$_4$·0.5 Pb(C$_{17}$H$_{33}$COO)$_2$ | 3.6 | 71.0 | 56.8 |
| 17 | 1 | 1(d) | 3.5 PbO·PbSO$_4$·0.5 Pb(C$_{17}$H$_{31}$COO)$_2$ | 4.0 | 71.0 | 56.8 |
| 18 | 1 | 1(e) | 3.5 PbO·PbSO$_4$·0.5 Pb(C$_7$H$_{15}$COO)$_2$ | 3.7 | 77.8 | 62.3 |
| 19 | 1 | 1(f) | 3 PbO·PbSO$_4$·PbC$_4$H$_8$(COO)$_2$ | 3.4 | 77.8 | 62.3 |
| 20 | 1 | 1(g) | 3.5 PbO·PbSO$_4$·0.5 Pb(C$_6$H$_5$COO)$_2$ | 4.9 | 79.2 | 62.5 |
| 21 | 1 | 1(h) | 3 PbO·PbSO$_4$·PbC$_6$H$_4$(COO)$_2$ | 4.4 | 76.6 | 61.3 |
| 22 | 1 | 1(i) | 3.5 PbO·PbSO$_4$·0.5 Pb(C$_{11}$H$_{23}$COO)$_2$ | 3.7 | 74.8 | 59.8 |
| 23 | 1 | 8(i) | PbSO$_4$·4 Pb(C$_{11}$H$_{23}$COO)$_2$ | 1.5 | 38.0 | 30.4 |

[1] The letters (c–i) indicate the following acids: (c)=oleic acid; (d)=linoleic acid; (e)=α-ethyl hexanoic acid; (f)=adipic acid (g)=benzoic acid; (h)=phthalic acid; (i)=lauric acid.

*Table III.—Reaction product of dibasic lead phosphate (j) and stearic acid (b)*

| Example No. | Molar ratio of— | | Formula of reaction product | Density | Total lead, percent |
|---|---|---|---|---|---|
| | (j) | (b) | | | |
| 24 | 1 | 1 | 1.5 PbO·PbHPO$_3$·0.5 H$_2$O·0.5 Pb(C$_{17}$H$_{35}$COO)$_2$ | 2.6 | 61.8 |
| 25 | 1 | 2 | PbO·PbHPO$_3$·0.5 H$_2$O·Pb(C$_{17}$H$_{35}$COO)$_2$ | 1.9 | 48.9 |
| 26 | 1 | 3 | 0.5 PbO·PbHPO$_3$·0.5 H$_2$O·1.5 Pb(C$_{17}$H$_{35}$COO)$_2$ | 1.8 | 40.5 |
| 27 | 1 | 4 | PbHPO$_3$·0.5 H$_2$O·2 Pb(C$_{17}$H$_{35}$COO)$_2$ | 1.7 | 34.6 |
| 28 | 1 | 5 | PbH$_2$PO$_3$(C$_{17}$H$_{35}$COO)·0.5 H$_2$O·2 Pb(C$_{17}$H$_{35}$COO)$_2$ | 1.6 | 30.2 |

Table IV.—Reaction product of basic lead carbonate (k) and stearic acid (b)

| Example No. | Molar ratio of— (k) | Molar ratio of— (b) | Formula of reaction product | Density | Total lead, percent |
|---|---|---|---|---|---|
| 29 | 1 | 1 | 0.5 Pb(OH)$_2$·2 PbCO$_3$·0.5 Pb(C$_{17}$H$_{35}$COO)$_2$ | 3.1 | 59.8 |
| 30 | 1 | 2 | 2 PbCO$_3$·Pb(C$_{17}$H$_{35}$COO)$_2$ | 1.8 | 47.6 |
| 31 | 1 | 3 | PbCO$_3$·PbHCO$_3$(C$_{17}$H$_{35}$COO)·Pb(C$_{17}$H$_{35}$COO)$_2$ | 1.8 | 39.6 |
| 32 | 1 | 4 | 2 PbHCO$_3$(C$_{17}$H$_{35}$COO)·Pb(C$_{17}$H$_{35}$COO)$_2$ | 1.7 | 34.0 |
| 33 | 1 | 5 | PbHCO$_3$(C$_{17}$H$_{35}$COO)·2 Pb(C$_{17}$H$_{35}$COO)$_2$ | 1.6 | 29.7 |

Table V.—Reaction product of tetrabasic lead sulfate (a), stearic acid (b), and lead oxide (l)

| Ex. No. | Molar ratio of— (a) | Molar ratio of— (b) | Molar ratio of— (l) | Formula of reaction product | Density | Total lead, percent | Reactive lead, percent |
|---|---|---|---|---|---|---|---|
| 34 | 1 | 1 | 1 | 4.5 PbO·PbSO$_4$·0.5 Pb(C$_{17}$H$_{25}$COO)$_2$ | 3.4 | 73.9 | 61.5 |
| 35 | 1 | 1 | 1.5 | 5 PbO·PbSO$_4$·0.5 Pb(C$_{17}$H$_{35}$COO)$_2$ | 3.6 | 75.0 | 63.5 |
| 36 | 1 | 1 | 2 | 5.5 PbO·PbSO$_4$·0.5 Pb(C$_{17}$H$_{35}$COO)$_2$ | 4.3 | 76.1 | 65.3 |
| 37 | 1 | 2 | 4 | 7 PbO·PbSO$_4$·Pb(C$_{17}$H$_{35}$COO)$_2$ | 3.1 | 71.4 | 63.4 |
| 38 | 1 | 8 | 12 | 12 PbO·PbSO$_4$·4 Pb(C$_{17}$H$_{35}$COO)$_2$ | 2.0 | 58.9 | 55.4 |
| 39 | 1 | 8 | 13 | 13 PbO·PnSO$_4$·4 Pb(C$_{17}$H$_{35}$COO)$_2$ | 2.4 | 60.0 | 56.7 |
| 40 | 1 | 8 | 14 | 14 PbO·PbSO$_4$·4 Pb(C$_{17}$H$_{35}$COO)$_2$ | 2.5 | 61.2 | 58.0 |
| 41 | 1 | 8 | 15 | 15 PbO·PbSO$_4$·4 Pb(C$_{17}$H$_{35}$COO)$_2$ | 2.6 | 62.2 | 59.0 |
| 42 | 1 | 8 | 16 | 16 PbO·PbSO$_4$·4 Pb(C$_{17}$H$_{35}$COO)$_2$ | 2.9 | 63.2 | 60.3 |
| 43 | 1 | 8 | 12 | 12 PbO·PbSO$_4$·4 Pb(C$_{17}$H$_{23}$COO)$_2$ | 2.6 | 64.7 | 61.0 |

Table VI.—Reaction product of tetrabasic lead sulfate (a), stearic acid (b), another organic acid (c, g, h, and m¹), and lead oxide (l)

| Ex. No. | Molar ratio of— (a) | Molar ratio of— (b) | Molar ratio of— (c), (g), (h), (m) | Molar ratio of— (l) | Formula of reaction product | Density | Total lead, percent | Reactive lead, percent |
|---|---|---|---|---|---|---|---|---|
| 44 | 1 | 1.5 | 0.5(h) | 4 | 6.75 PbO·PbSO$_4$·0.75 Pb(C$_{17}$H$_{35}$COO)$_2$·0.5 PbC$_6$H$_4$(COO)$_2$ | 3.4 | 73.2 | 65.0 |
| 45 | 1 | 1.5 | 0.5 (g) | 4 | 7 PbO·PbSO$_4$·0.75 Pb(C$_{17}$H$_{35}$COO)$_2$·0.25 Pb(C$_6$H$_5$COO)$_2$ | 3.6 | 73.5 | 65.3 |
| 46 | 1 | 1.5 | 0.5 (m) | 4 | 7 PbO·PbSO$_4$·0.75 Pb(C$_{17}$H$_{35}$COO)$_2$·0.25 Pb(C$_6$H$_4$OH·COO)$_2$ | 3.6 | 73.8 | 65.5 |
| 47 | 1 | 1.5 | 0.5 (c) | 4 | 7 PbO·PbSO$_4$·0.75 Pb(C$_{17}$H$_{35}$COO)$_2$·0.25 Pb(C$_{17}$H$_{35}$COO)$_2$ | 3.1 | 71.3 | 63.4 |

¹ The letter (m) used in Table VI indicates salicylic acid.

Table VII.—Reaction product of dibasic lead phosphite (j), stearic acid (b), and lead oxide (l)

| Example No. | Molar ratio of— (j) | Molar ratio of— (b) | Molar ratio of— (l) | Formula of reaction product | Density | Total lead, percent | Reactive lead, percent |
|---|---|---|---|---|---|---|---|
| 48 | 1 | 2 | 1 | 2 PbO·PbHPO$_3$·Pb(C$_{17}$H$_{35}$COO)$_2$ | 2.2 | 54.4 | 40.7 |
| 49 | 1 | 2 | 2 | 3 PbO·PbHPO$_3$·Pb(C$_{17}$H$_{35}$COO)$_2$ | 2.4 | 59.3 | 47.4 |
| 50 | 1 | 2 | 3 | 4 PbO·PbHPO$_3$·Pb(C$_{17}$H$_{35}$COO)$_2$ | 2.7 | 63.2 | 52.6 |
| 51 | 1 | 2 | 4 | 5 PbO·PbHPO$_3$·Pb(C$_{17}$H$_{35}$COO)$_2$ | 2.9 | 66.2 | 56.7 |
| 52 | 1 | 4 | 7 | 7 PbO·PbHPO$_3$·2 Pb(C$_{17}$H$_{35}$COO)$_2$ | 2.9 | 61.1 | 55.0 |

Table VIII.—Reaction product of basic lead carbonate (k), stearic acid (b), and lead oxide (l)

| Example No. | Molar ratio of— (k) | Molar ratio of— (b) | Molar ratio of— (l) | Formula of reaction product | Density | Total lead, percent |
|---|---|---|---|---|---|---|
| 53 | 1 | 1 | 1 | 0.5 PbO·Pb(OH)$_2$·2 PbCO$_3$·0.5 Pb(C$_{17}$H$_{35}$COO)$_2$ | 3.1 | 65.5 |
| 54 | 1 | 4 | 1 | 2 PbCO$_3$·2 Pb(C$_{17}$H$_{35}$COO)$_2$ | 3.0 | 40.4 |
| 55 | 1 | 4 | 2 | PbO·2 PbCO$_3$·2 Pb(C$_{17}$H$_{35}$COO)$_2$ | 2.1 | 45.6 |
| 56 | 1 | 4 | 3 | 2 PbO·2 PbCO$_3$·2 Pb(C$_{17}$H$_{35}$COO)$_2$ | 2.1 | 49.8 |
| 57 | 1 | 4 | 4 | 3 PbO·2 PbCO$_3$·2 Pb(C$_{17}$H$_{35}$COO)$_2$ | 2.3 | 53.3 |
| 58 | 1 | 4 | 5 | 4 PbO·2 PbCO$_3$·2 Pb(C$_{17}$H$_{35}$COO)$_2$ | 2.4 | 56.2 |

In place of triethanolamine stearate used as catalyst in Example 1 or of sodium stearate used as catalyst in Example 5, or of polyethylene glycol used as catalyst in Example 7, there may be employed other catalysts, for instance, the following compounds: aliphatic monobasic and polybasic alcohols, as isopropanol, glycerol; aromatic monobasic alcohols, as benzyl alcohol; sulfonates of fatty alcohols.

As shown in Example 5, the catalyst may be formed in the reaction mixture by the addition of agents capable of combining with each other to form the desired wetting agent.

Of course, many changes and variations in the reactants, the inorganic basic lead salts, the organic mono- or dibasic acids, the catalytically acting wetting agent, in the reaction conditions, temperature, and duration, in the amounts of lead oxide added additionally to the reaction mixture, in the concentration and molar ratio of the reactants in the aqueous dispersions and/or solutions, in the method of removing the resulting basic complex lead salts from the reaction mixture and of drying them, and the like may be made by those skilled in the art in accordance with the principles set forth herein and in the claims annexed hereto.

The new basic complex lead salts according to the present invention have a remarkable stabilizing effect upon plastics of the polyvinyl chloride type and of copolymerization products containing such polyvinyl chlorides such as copolymerization products of vinyl chloride with vinyl acetate, vinylidene chloride, acrylonitrile, vinyl propionate, vinyl butyrate, vinyl chloroacetate, ethyl methacrylate, and others.

The amount of stabilizing basic complex lead salts according to the present invention admixed to the plastic composition is preferably between about 0.5% by weight and about 10% by weight of the amount of halogen containing synthetic resin and especially of polyvinyl chloride employed. Especially advantageous results are achieved when admixing between about 2% by weight and about 3% by weight of the basic complex lead salt to the plastic composition.

The stabilizing effect of the new basic complex lead compounds according to the present invention is far superior to the stabilizing effect achieved by other basic inorganic lead compounds as they are conventionally used as stabilizing agents. The stabilizing effect is especially evident when testing the respective compositions for their heat stability and their specific electrical resistivity.

We claim:

1. The complex lead compound of the formula $$n\text{PbO}\cdot\text{PbAc}_1\cdot m\text{Pb}(\text{Ac}_2)_x$$

wherein $n$ indicates the numerals 0 to 16;
$m$ indicates the numerals 0.5 to 4;
$\text{Ac}_1$ indicates the dibasic inorganic acid residue selected from the group consisting of the sulfate group of the formula $>\text{SO}_4$, the carbonate group of the formula $>\text{CO}_3$, and the phosphite group of the formula $>\text{HPO}_3$;
$\text{Ac}_2$ indicates an organic acid residue selected from the group consisting of the residue of a saturated monobasic aliphatic acid, a saturated dibasic aliphatic acid, an unsaturated monobasic aliphatic acid, an unsaturated dibasic aliphatic acid, a monobasic aromatic acid, and a dibasic aromatic acid; and
$x$ indicates the numeral 1 when $\text{Ac}_2$ is the residue of a dibasic organic acid, and the numeral 2 when $\text{Ac}_2$ is the residue of a monobasic organic acid.

2. The complex lead compound of the formula $$n\text{PbO}\cdot\text{PbSO}_4\cdot m\text{Pb}(\text{St})_2$$

wherein $n$ indicates the numerals 0 to 16;
$m$ indicates the numerals 0.5 to 4; and
St indicates the stearic acid residue.

3. The complex lead compound of the formula $$n\text{PbO}\cdot\text{PbHPO}_3\cdot m\text{Pb}(\text{St})_2$$

wherein $n$ indicates the numerals 0 to 16;
$m$ indicates the numerals 0.5 to 4; and
St indicates the stearic acid residue.

4. The complex lead compound of the formula $$n\text{PbO}\cdot\text{PbCO}_3\cdot m\text{Pb}(\text{St})_2$$

wherein $n$ indicates the numerals 1 to 16;
$m$ indicates the numerals 0.5 to 4; and
St indicates the stearic acid residue.

5. The complex lead compound of the formula $$n\text{PbCO}_3\cdot\text{PbHCO}_3(\text{St})\cdot m\text{Pb}(\text{St})_2$$

wherein $n$ indicates the numerals 0 to 2;
$m$ indicates the numerals 1 to 2; and
St indicates the stearic acid residue.

6. The complex basic lead sulfate-lead stearate salt corresponding to the empirical formula $$3\text{PbO}\cdot\text{PbSO}_4\cdot\text{Pb}(\text{C}_{17}\text{H}_{35}\text{COO})_2$$

7. The complex lead sulfate-lead stearate salt corresponding to the empirical formula $$\text{PbSO}_4\cdot 4\text{Pb}(\text{C}_{17}\text{H}_{35}\text{COO})_2$$

8. The complex basic lead sulfate-lead oleate salt corresponding to the empirical formula $$3.5\text{PbO}\cdot\text{PbSO}_4\cdot 0.5\text{Pb}(\text{C}_{17}\text{H}_{33}\text{COO})_2$$

9. The complex basic lead sulfate-lead adipate salt corresponding to the empirical formula $$3\text{PbO}\cdot\text{PbSO}_4\cdot\text{Pb}[\text{C}_4\text{H}_8(\text{COO})_2]$$

10. The complex basic lead phosphite-lead stearate salt corresponding to the empirical formula $$\text{PbO}\cdot\text{PbHPO}_3\cdot 0.5\text{H}_2\text{O}\cdot\text{Pb}(\text{C}_{17}\text{H}_{35}\text{COO})_2$$

11. The complex lead phosphite-lead stearate salt corresponding to the empirical formula $$\text{PbHPO}_3\cdot 0.5\text{H}_2\text{O}\cdot 2\text{Pb}(\text{C}_{17}\text{H}_{35}\text{COO})_2$$

12. The complex basic lead carbonate-lead stearate salt corresponding to the empirical formula $$0.5\text{Pb}(\text{OH})_2\cdot 2\text{PbCO}_3\cdot 0.5\text{Pb}(\text{C}_{17}\text{H}_{35}\text{COO})_2$$

References Cited in the file of this patent

UNITED STATES PATENTS

| | | |
|---|---|---|
| 2,194,526 | Pfansteil | Mar. 26, 1940 |
| 2,391,166 | Kebrich | Dec. 18, 1945 |
| 2,415,917 | Stewart et al. | Feb. 18, 1947 |
| 2,421,706 | Kebrich | June 3, 1947 |
| 2,424,515 | Stewart et al. | July 22, 1947 |
| 2,783,159 | Taylor | Feb. 26, 1957 |

FOREIGN PATENTS

| | | |
|---|---|---|
| 841,328 | Great Britain | July 13, 1960 |